United States Patent
Chiu et al.

[19]

[11] Patent Number: 5,926,350
[45] Date of Patent: Jul. 20, 1999

[54] DUAL GAP HORIZONTAL THIN FILM INDUCTIVE HEAD

[75] Inventors: Andrew Chiu; Cherngye Hwang; Randall George Simmons, all of San Jose, Calif.

[73] Assignee: International Business Machines Corporation, Armonk, N.Y.

[21] Appl. No.: 08/616,607

[22] Filed: Mar. 15, 1996

[51] Int. Cl.$^6$ .............................. G11B 5/29; G11B 5/147
[52] U.S. Cl. ........................................ 360/121; 360/126
[58] Field of Search .................................. 360/121, 113, 360/125, 126, 123

[56] References Cited

U.S. PATENT DOCUMENTS

| | | | |
|---|---|---|---|
| 4,742,412 | 5/1988 | Kuriyama | 360/119 |
| 4,908,724 | 3/1990 | Jeffers | 360/123 |
| 4,942,490 | 7/1990 | Lehureau | 360/126 |
| 4,949,207 | 8/1990 | Lazzari | 360/119 |
| 5,212,611 | 5/1993 | Dee | 360/113 |
| 5,274,520 | 12/1993 | Matsuzono et al. | 360/113 |
| 5,394,285 | 2/1995 | Sundaram | 360/121 |
| 5,434,733 | 7/1995 | Hesterman et al. | 360/121 |
| 5,435,053 | 7/1995 | Krounbi et al. | 360/113 |
| 5,606,478 | 2/1997 | Chen et al. | 360/113 |

FOREIGN PATENT DOCUMENTS 61-240413  10/1986  Japan .

*Primary Examiner*—Allen T. Cao
*Attorney, Agent, or Firm*—Gray Cary Ware & Freidenrich

[57] ABSTRACT

A dual gap horizontal thin film inductive head is provided which writes wide and reads narrow so as to avoid noise problems when reading an information track on a magnetic medium. The head has first and second gap layers between first and second horizontal pole tips. The pole tips and the corresponding pole pieces of the head are constructed of a high magnetic moment material, such as NiFe (Permalloy). The first gap layer is constructed of a magnetic insulator, such as tungsten, and the second gap layer is constructed of a low magnetic moment material, such as NiFeCr. Accordingly, the magnetic moment of the second gap layer is lower than the magnetic moment of the first and second pole tips and the corresponding first and second pole pieces. During recording both gap layers function as a gap because the second gap layer is saturated and behaves as a magnetic insulator. During playback only the first gap layer functions a gap because the second gap layer is not saturated causing it to behave as a magnetic conductor. Accordingly, during record the head "writes wide" and during playback the head "reads narrow." A unique method is provided for making the head which employs a vertical edge of a photoresist layer for forming the first and second gap layers.

32 Claims, 6 Drawing Sheets

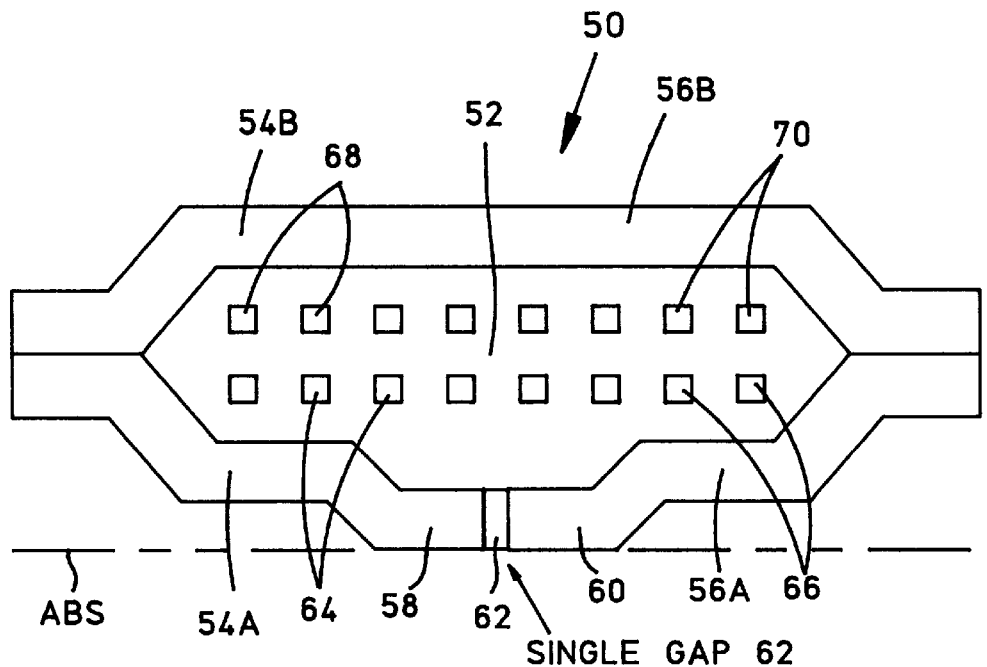
FIG. 3 *(Prior Art)*
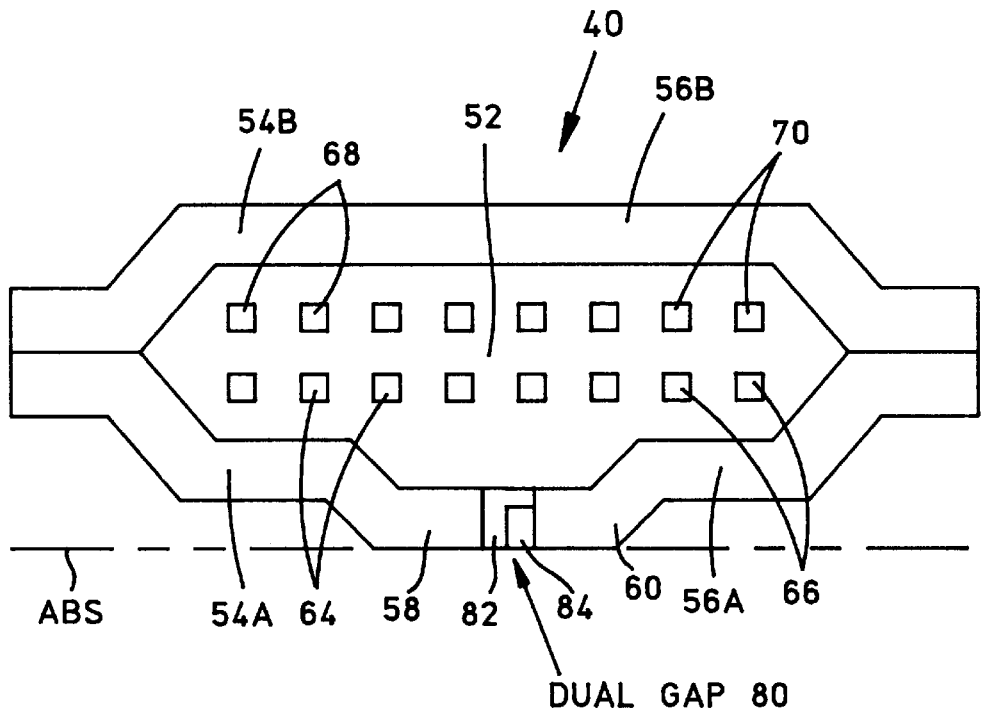
FIG. 4

DUAL GAP HORIZONTAL THIN FILM INDUCTIVE HEAD

BACKGROUND OF THE INVENTION

1. Field of the Invention

The present invention relates to a dual gap horizontal thin film inductive head and more particularly to a horizontal thin film inductive head which employs a dual gap for writing wide and reading narrow.

2. Description of the Related Art

In the magnetic recording arts a magnetic head records a track of information on a magnetic medium, and the same magnetic head or another magnetic head reads the recorded track of information. The magnetic head is mounted on a slider adjacent the magnetic medium, such as a magnetic tape or a magnetic disk. The track width of the magnetic head is important from the standpoint of the density of information that can be recorded and read from a square inch of the magnetic medium. This density, known as "areal density", is a product of track density (tracks per inch, or TPI) and linear density (bits per inch, or BPI, along a track). Track density is dependent upon the width of the sensitive element of the magnetic head, while linear density is dependent upon the gap length between magnetic elements of the magnetic head.

A typical arrangement for recording and playback is a single inductive head. An inductive head has an inductive coil embedded in an insulation stack, the coil and insulation stack being sandwiched between a pair of pole pieces. The pole pieces terminate at an air bearing surface (ABS) in a pair of pole tips which are separated by a gap. Track density is determined by the width of the pole tips at the ABS; linear density is determined by the length of the gap between the pole tips at the ABS. During recording, flux fringes from one pole tip to the other across the gap and magnetizes the magnetic medium to record information. During playback the recorded magnetic fields in the magnetic medium are conducted by the pole tips to the coil where readback voltage is induced.

Track width is the same for both recording and playback. This presents a problem during playback since the pole tips will pick up fields from tracks adjacent the track being read. If the track width of the pole tips could be effectively narrowed during playback this problem would be avoided. Unfortunately, there is currently no way to do this with an inductive magnetic head which performs both recording and playback. One solution has been to provide the magnetic medium with guard bands between the information tracks so that during playback the pole tips of the inductive magnetic head are not influenced by fields from adjacent tracks. However, guard bands occupy area on the magnetic medium, thereby limiting areal density.

Because of the aforementioned problems a basic goal in the magnetic recording arts has been to constrain the magnetic head to write wide information tracks and then to read narrowly within the written information tracks ("write wide and read narrow"). One magnetic head arrangement meeting this goal employs two magnetic heads mounted on a slider, one head being a recording head, with a wide track width, and the other a read head, with a narrow track width. The write head is typically an inductive magnetic head as described above and the read head is typically a magnetoresistive (MR) head. An MR head includes an MR sensor which is positioned between first and second gap layers which are, in turn, sandwiched between first and second shield layers. The MR sensor has a width at the ABS which is less than the width of the pole tips of the inductive write head at the ABS. When the magnetic medium is moved relative to the MR head magnetic fields from information tracks induce changes in the resistance of the MR sensor. A sense current is conducted through the MR sensor exhibits these changes as a playback signal. This arrangement, which is referred to as a "merged" or "piggyback" MR head, obviates the requirement of guard bands. However, a merged MR head has many components which must be accurately aligned in order to perform properly. Consequently, merged MR heads are very complex devices, difficult and expensive to manufacture.

Typically, thin film inductive heads are made and mounted such that their films are either parallel or perpendicular to the recording medium. C. D. Mee, et al., *Magnetic Recording Volume 1: Technology*, McGraw-Hill, 1987, pp. 316–317. Parallel-film heads, also called "horizontal heads", are coveted for their superior low inductance attribute. In the prior art, merged MR heads with horizontal thin film inductive elements are known (U.S. Pat. No. 5,274,520 is an example). However, at the time of making the invention described and claimed in this patent application, the prior art required that the horizontal inductive head and the MR element be formed in separate fabrication steps, with the result that alignment between the elements was critically hard to maintain. Consequently, either the read or the write function was optimized, requiring a compromise of the other function.

There is a strong felt need for an inductive head arrangement which can write wide and read narrow with fewer components than the merged MR head.

SUMMARY OF THE INVENTION

This invention incorporates a dual gap into the structure of a horizontal thin film head, allowing the structure to be optimized for both read and write functions without compromising one for the other. Stated differently, a head that includes a dual gap horizontal thin film according to this invention is enabled to "write wide and read narrow." In the horizontal head, first and second gap layers are formed in the gap between the pole tips of the horizontal head. The first gap layer is a magnetic insulator and the second gap layer is a magnetic material having a magnetic moment which is less than the magnetic moment of the pole pieces. The thicknesses of the first and second gap layers fill the length of the gap between the pole tips and define two gap lengths, one gap length being the combination of the thicknesses of the first and second gap layers during recording and the other gap length being the thickness of only the first gap layer during playback. During recording, flux from the pole pieces saturates the second gap layer so as to fringe across both of the first and second layers, but during playback, the lower-strength fields from the magnetic medium do not saturate the second gap layer and fringe across only the first gap layer. Accordingly, during recording the second gap layer acts as a magnetic insulator, and, during playback, the second gap layer acts as a magnetic conductor. Since the magnetic moment of the pole pieces is higher than the magnetic moment of the second gap layer, the pole pieces do not saturate during playback. Accordingly, the first and second gap layers serve the purposes of writing wide and reading narrow by operating collectively during recording to provide a long gap length, while the first gap operates alone during playback to provide a short gap length.

The invention also employs novel thin film techniques for making the dual gap horizontal magnetic head. After forming an insulation stack with one or more embedded coils, a resist layer with a vertical edge is formed over a top portion of the insulation stack. A first layer of insulating material is then formed over the top portion of the resist layer, its vertical edge and another top portion of the insulation stack so that the first layer has a vertical portion with a vertical edge adjacent the vertical edge of the resist layer. A second layer of material, which has a magnetic moment less than the pole pieces, is then formed over the first layer with a vertical portion with a vertical edge adjacent the vertical portion of the first gap layer. The formations of the first and second layers may be accomplished by chemical vapor deposition (CVD). The first and second layers are then removed, leaving only their vertical portions. These vertical portions provide the aforementioned first and second gap layers. This removal may be accomplished by reactive ion etching (RIE). The resist layer is then removed, the remainder of the pole pieces are formed adjacent to the first and second gap layers, and the head is lapped to form the ABS.

An object of the present invention is to provide a low cost dual gap, horizontal thin film inductive head, which will write wide and read narrow.

Another object is to provide a horizontal thin film inductive head which changes its track width from wide to narrow when the head changes from recording to reading respectively.

A further object is to provide a method of making a dual gap horizontal thin film inductive head.

Other objects and attendant advantages of the invention will be readily apparent upon reading the following description taken together with the accompany drawings.

BRIEF DESCRIPTION OF THE DRAWINGS

FIG. 3 is a vertical cross-section of a prior art single gap horizontal thin film inductive head.

FIG. 4 is a vertical cross-section of the present dual gap horizontal thin film inductive head.

DESCRIPTION OF THE PREFERRED EMBODIMENT

Figure 1:
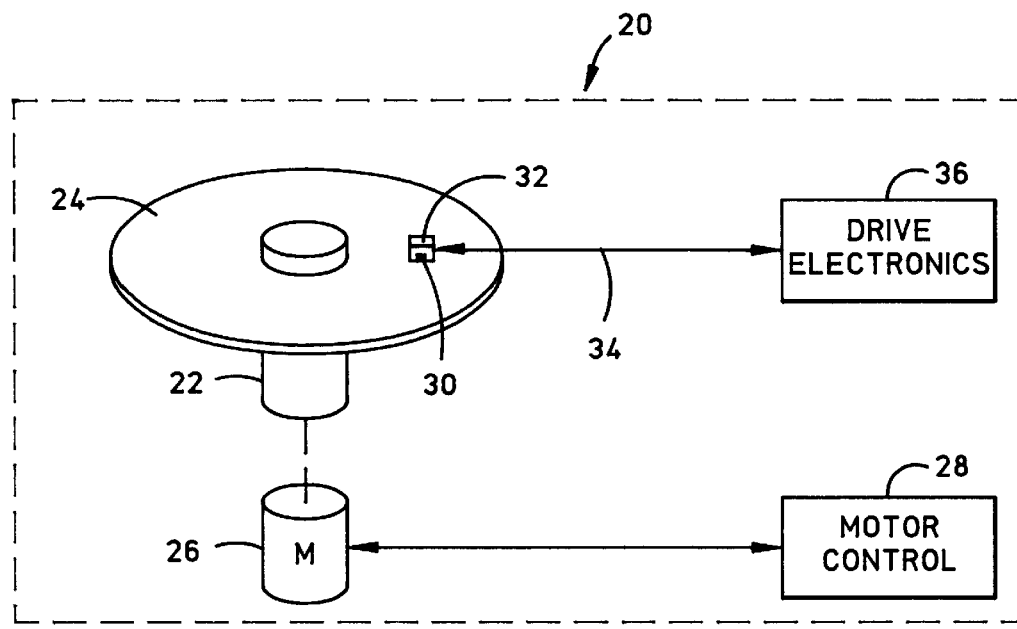
FIG. 1 is a schematic illustration of a magnetic disk drive which employs the present dual gap horizontal thin film inductive head.

Referring now to the drawings wherein like reference numerals designate like or similar parts throughout the several views, there is illustrated in FIG. 1 a disk drive 20. The drive 20 includes a spindle 22 which supports and rotates a magnetic disk 24. The spindle 22 is rotated by a motor 26 which is controlled by motor control 28. A dual gap horizontal thin film inductive head 30 of the present invention is mounted on a slider 32, the slider being supported by a suspension and actuator arm 34. The suspension and actuator arm 34 positions the slider 32 so that the head 30 is in a transducing relationship with a surface of the magnetic disk 24. When the disk 24 is rotated by the motor 26, air is moved by the surface of the disk, causing the slider to ride on a cushion of air (an air bearing) slightly above the surface, in the order of 0.075 microns. The head 30 is then employed for writing information to multiple circular tracks on the surface of the disk 24 as well as reading information therefrom. These information signals, as well as servo signals for moving the slider to various tracks, are processed by drive electronics 36.

Figure 2:
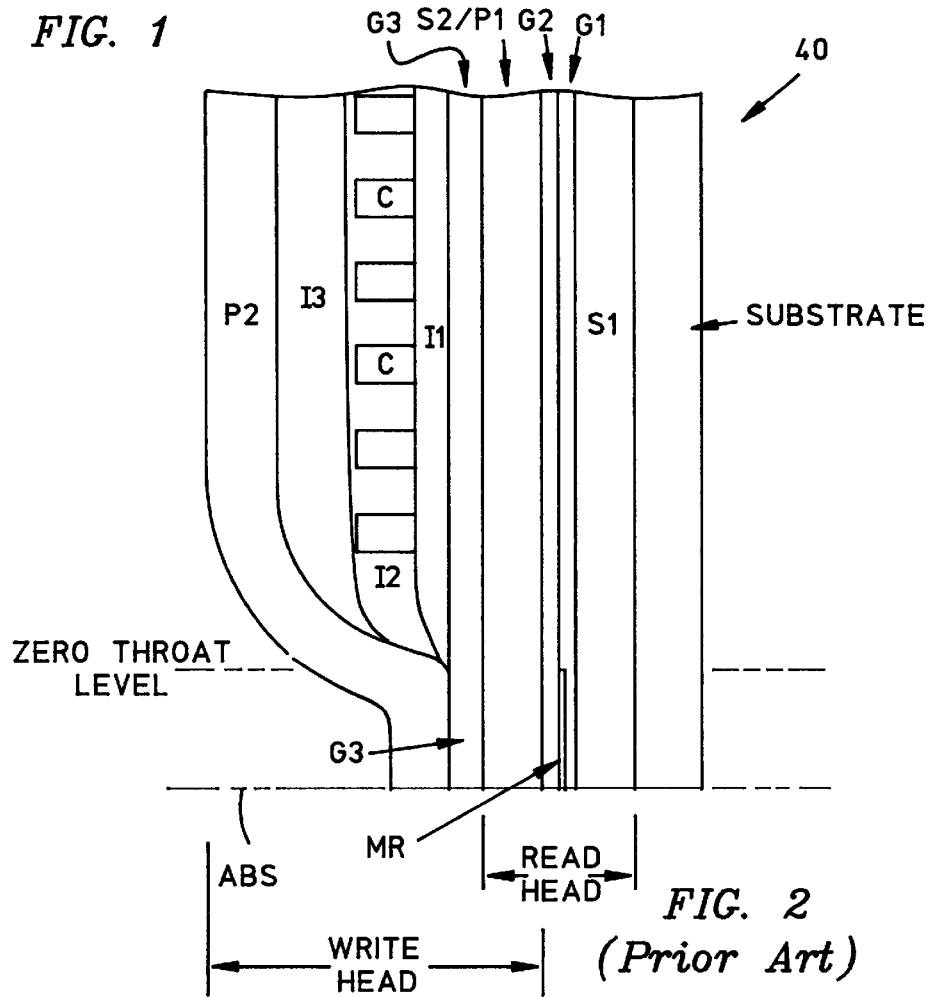
FIG. 2 is a vertical cross-section of a prior art merged MR head.

FIG. 2 is a cross-sectional schematic illustration of a prior art merged MR head 40 which includes a read head portion and a write head portion which are lapped to form an air bearing surface (ABS), the ABS being spaced from the surface of the rotating disk by the air bearing as discussed hereinabove. The read head portion includes an MR sensor which is sandwiched between first and second gap layers G1 and G2 which are, in turn, sandwiched between first and second shield layers S1 and S2. The write head portion includes a coil layer C and insulation layer I2 which are sandwiched between insulation layers I1 and I3 which are, in turn, sandwiched between first and second pole pieces P1 and P2. A gap layer G3 is sandwiched between the first and second pole pieces at their pole tips adjacent the ABS for providing a magnetic gap. When signal current is conducted through the coil layer C, signal flux is induced into the first and second pole layers P1 and P2 causing signal fringe flux across the pole tips at the ABS. This signal fringe flux is induced into circular tracks on the rotating disk 24, shown in FIG. 1, during a write operation. During a read operation, recorded magnetic flux signals on the rotating disk are induced into the MR sensor of the read head causing resistance changes in the MR sensor which can be sensed by voltage changes of a sense current (not shown) conducted through the MR sensor. The voltage changes are processed by the drive electronics 36 shown in FIG. 1. The combined head illustrated in FIG. 2 is a merged MR head in which the second shield layer S2 of the read head is employed as a first pole piece P1 for the write head. In a piggyback head (not shown) the second shield layer S2 and the first pole piece P1 are separate layers.

FIG. 3 illustrates a prior art single gap thin film horizontal inductive head 50 for recording and playback. The prior art head 50 includes an insulation stack 52 which is sandwiched between a first pole piece 54A and 54B and a second pole piece 56A and 56B, the layers 54A and 56A comprising bottom portions of the first and second pole pieces and the components 54B and 56B comprising top portions of the first and second pole pieces. The bottom portions 54A and 56A terminate in first and second pole tips 58 and 60 which are separated by a single gap layer 62. The pole pieces are formed from conventional magnetic material having a magnetic moment. Embedded within the insulation stack 52 is one or more coil layers 64, 66, 68 and 70 which are employed for inducing flux into the pole pieces during record or responding to flux therefrom during playback. The coils 64, 66, 68 and 70 are connected to the drive electronics 36 in FIG. 1. The drive electronics transmit signals to the coils during record and receive signals from the coils during playback.

The track width of the head 50 for record and playback is the width of the gap 62 perpendicular to the paper. The length of the gap in the plane of the paper affects the track width of the circular track written on the magnetic disk and the reading thereof. Accordingly, the longer the gap the wider the track width during record or playback due to the lateral dimension of the write flux pattern or the read flux pattern. The gap 62 comprises a thin layer of non-magnetic material such as alumina or tungsten. The horizontal magnetic head is desired because of its high reluctance. Unfortunately, it has the same reading problem as the perpendicular inductive head. The track width is the same for playback as it is for recording. Accordingly, during playback signals recorded on tracks adjacent to the track being read interfere with the signals on the track being read so as to cause noise and distortion thereof. In the prior art this is remedied by providing guard bands between the tracks so that the signals on the tracks adjacent the track being read are distanced from the width of the pole tips 58 and 60.

Figure 5:
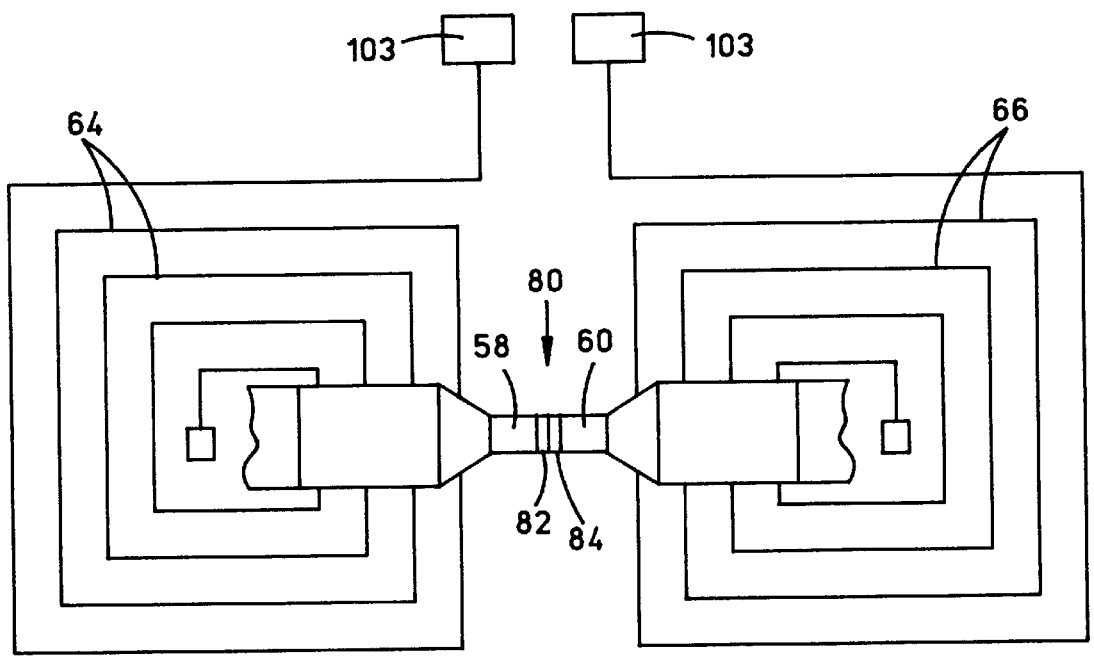
FIG. 5 is a schematic plan view of the bottom ABS side of the present dual gap horizontal thin film inductive head.
Figure 6:
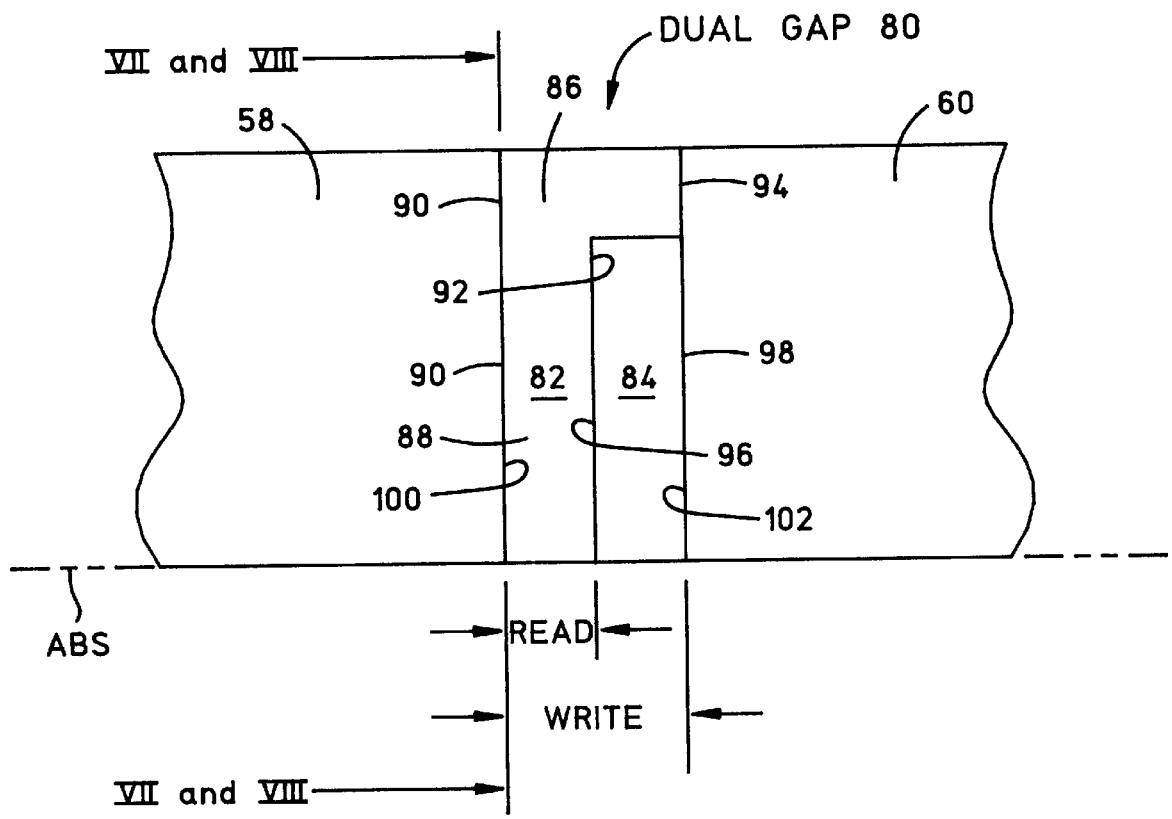
FIG. 6 is an enlarged side view of the gap layers of FIG. 4.

The present dual gap horizontal thin film inductive head 40, shown in FIGS. 4-6, is the same as the prior art single gap horizontal thin film inductive head 50, shown in FIG. 3, except the present head 40 has a dual gap 80 which includes first and second gap layers 82 and 84. The first gap layer 82 is constructed of a non-magnetic material, such as tungsten, and the second gap layer 84 is constructed of a magnetic material having a magnetic moment less than the magnetic moment of the first and second pole tips 58 and 60 and their corresponding first and second pole pieces. The first gap layer 82 is an upside down L-shape, as seen in FIGS. 4 and 6, in a plane perpendicular to the ABS along the length of the gap, the first gap layer 82 having a base component 86 and a vertical component 88. The vertical component 88 has vertical surfaces 90 and 92 and the base component 86 has vertical surfaces 90 and 94. The second gap layer 84 has vertical surfaces 96 and 98. The vertical surfaces 90 and 92 of the vertical component 88 of the first gap layer directly contact a vertical edge 100 of the first pole piece 58 and the vertical surface 96 respectively of the second gap layer 84. The vertical surfaces 90 and 94 of the base component 86 of the first gap layer directly contact the vertical edge 100 of the first pole tip 58 and a vertical edge 102 of the second pole tip 60. The vertical surface 98 of the second gap layer directly contacts the vertical edge 102 of the second pole tip 60. With this arrangement the second gap layer 84 makes contact with only one pole tip while the first gap layer 82 makes direct contact with both of the pole tips 58 and 60. In FIG. 5 the coils 64 and 66 are shown connected to pads 103.

Figure 7:
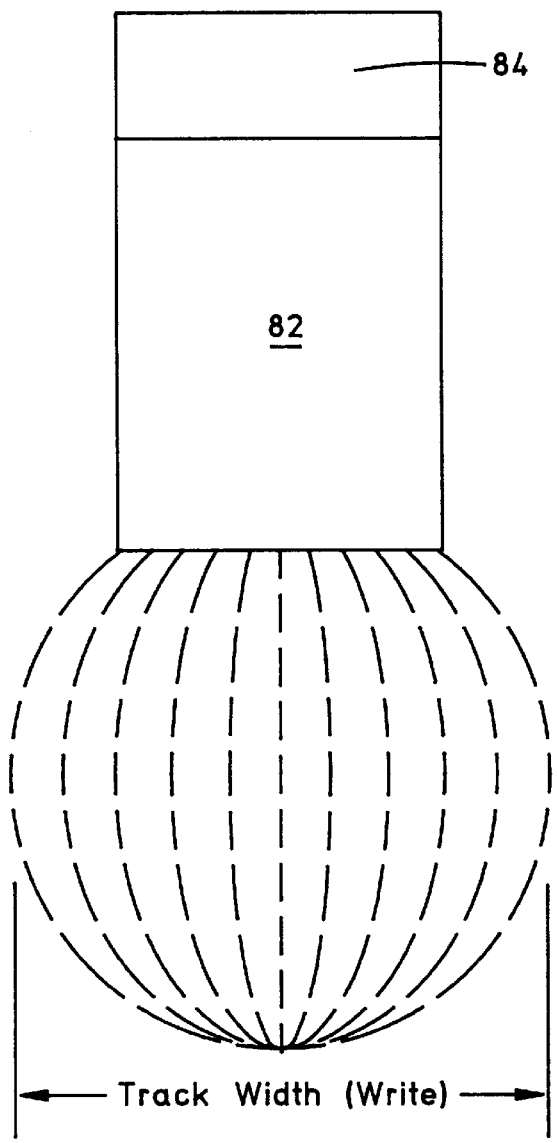
FIG. 7 is a view taken along plane VII—VII of FIG. 6 during recording by the head.
Figure 8:
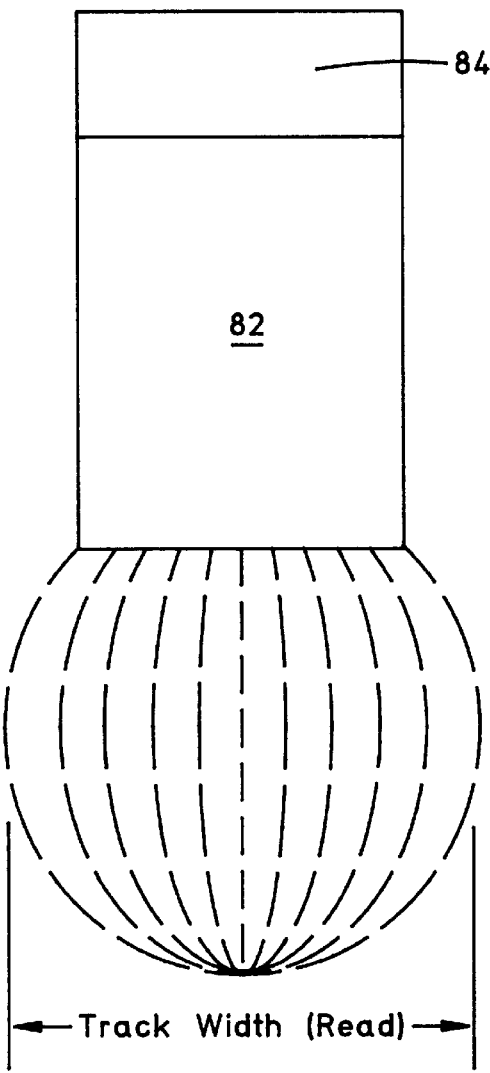
FIG. 8 is a view taken along plane VIII—VIII of FIG. 6 during playback by the head.

The dual gap horizontal thin film inductive head 40 shown in FIGS. 4 and 5 operates in a dual gap capacity as it performs its recording and playback functions. During recording the head 40 has a long gap length and during playback the head 40 has a short gap length as seen in FIG. 6. During recording the signal flux from the pole tips fringes across both of the gap layers 82 and 84 whereas during playback the signal flux from the rotating disk fringes across only the first gap layer 82. This occurs because during recording the second gap layer 84 is saturated which causes it to act collectively with the first gap layer 82 as a magnetic insulator for making a large flux pattern, as shown in FIG. 7, whereas during playback the second gap layer 84 is not saturated causing it to perform as a magnetic conductor thereby causing the head to read a small flux pattern, as shown in FIG. 8. By this novel dual gap arrangement the head 40 will write wide and read narrow so as to avoid any reading problems. This is the first time that a single thin film inductive head has been employed for performing high resolution recording and playback without guard bands.

A preferred material for the pole tips 58 and 60 and the corresponding pole pieces is NiFe (Permalloy). A preferred material for the second gap layer 84 is NiFeCr which is a lower magnetic moment than Permalloy. A preferred material for the first gap layer 82 is tungsten (W). Permalloy has a magnetic moment of about 10 kilogauss (KG). A preferred magnetic moment of the NiFeCr second gap layer 84 is about 2.5 KG or about ¼ the magnetic moment of Permalloy. This can be obtained with about 90% Permalloy and 10% Cr. A suitable range for the NiFeCr second gap layer 84 is 1.5–4.5 KG. Iron nitride based alloys such as FeN, FeAlN, and others can also be employed for the pole pieces. The magnetic moment of iron nitride based alloys such as FeN is about 20 KG in which case the preferred magnetic moment for the NiFeCr second gap layer is about 5 KG with a suitable range of 3.0 to 9.0 KG. It should be understood that other suitable materials can be employed for these various components.

Figure 9A:
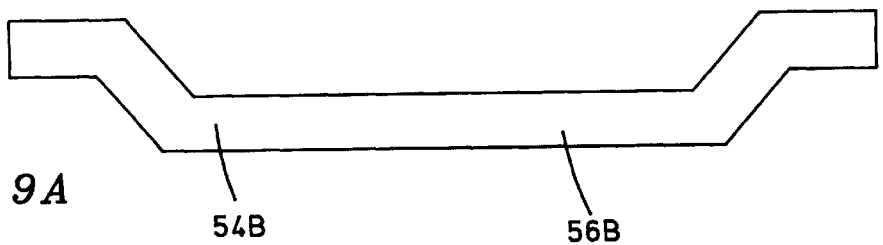
FIGS. 9A–9H are schematic cross-sectional illustrations of various steps involved in a method of making the present dual gap horizontal thin film inductive head.
Figure 9B:
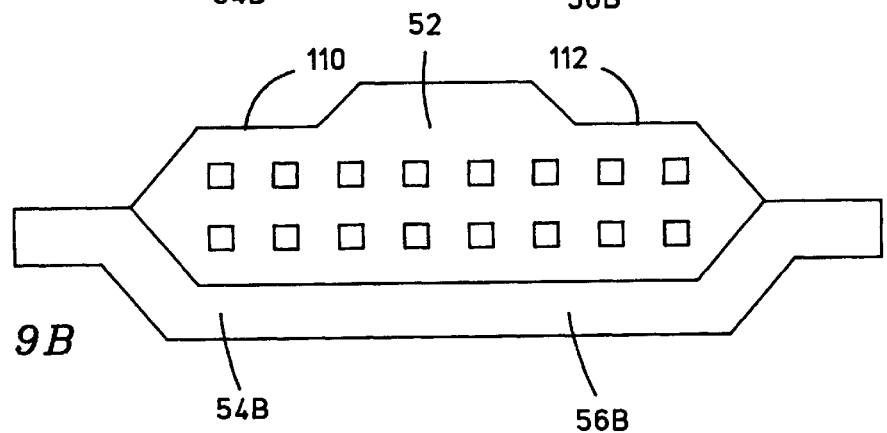
Figure 9C:
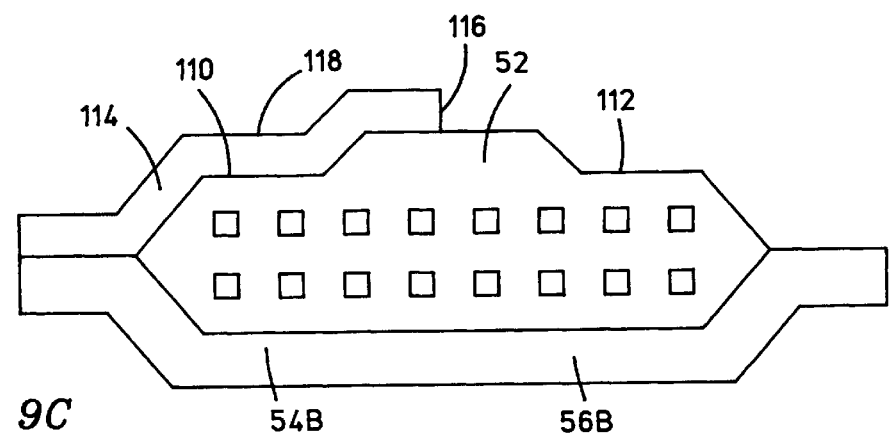
Figure 9D:
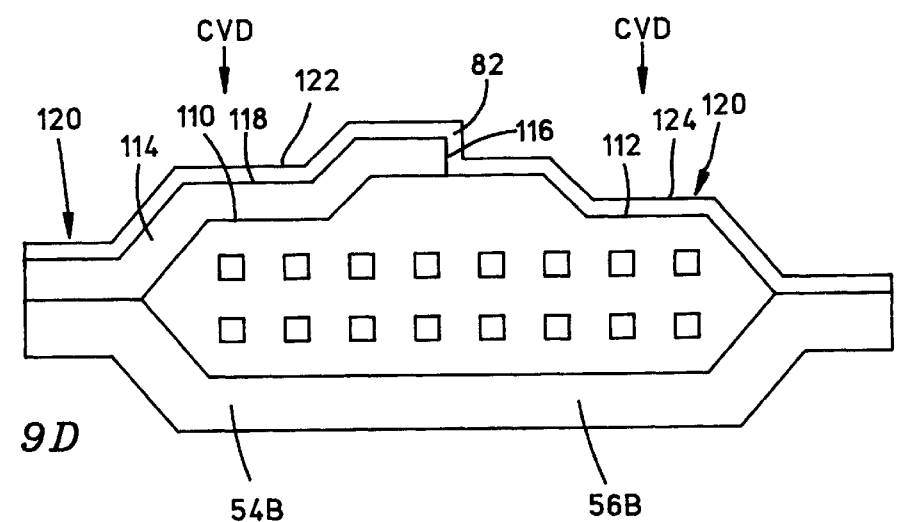
Figure 9E:
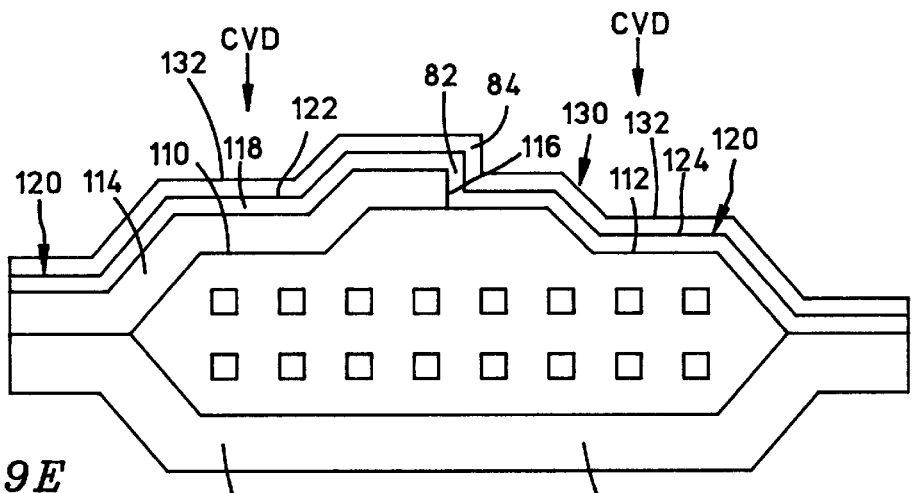

A unique method of making the dual gap horizontal thin film inductive head 40 is shown in FIGS. 9A–9H. In FIG. 9A the components 54B and 56B of the first and second pole pieces are formed. In FIG. 9B an insulation stack 52 comprising a plurality of insulation layers is formed with one or more coil layers 64, 66, 68 and 70. The insulation stack 52 has first and second top surface portions 110 and 112. As shown in FIG. 9C a photoresist layer 114 is then formed on the first top surface portion 110 of the insulation stack with a vertical edge 116 in a gap region and a top surface 118 which is over the first top surface portion 110 of the insulation stack. As shown in FIG. 9D a magnetic insulative layer 120 is formed on top of the surface 118 of the photoresist layer, adjacent the vertical edge 116 of the photoresist layer and on top of the second top surface portion 112 of the insulation stack so that the magnetic insulative layer 120 has a first top surface portion 122 over the top surface portion 118 of the photoresist layer, a vertical layer portion 82 adjacent the vertical edge 116 of the photoresist layer and a second top surface portion 124 on top of the second top surface portion 112 of the insulation stack. As shown in FIG. 9E a low magnetic moment layer 130 is formed on the first top surface portion 122 of the magnetic insulative layer 120, adjacent the vertical portion 82 of the magnetic insulation layer 120 and on the second top surface portion 124 of the magnetic insulation layer 120 so that the low moment magnetic layer 130 has a top surface portion 132 over the first top surface portion 122 of the magnetic insulation layer, a vertical component 84 adjacent the vertical component 82 of the magnetic insulation layer and a top surface portion 132 on top of the second top surface portion 124 of the magnetic insulation layer.

Figure 9F:
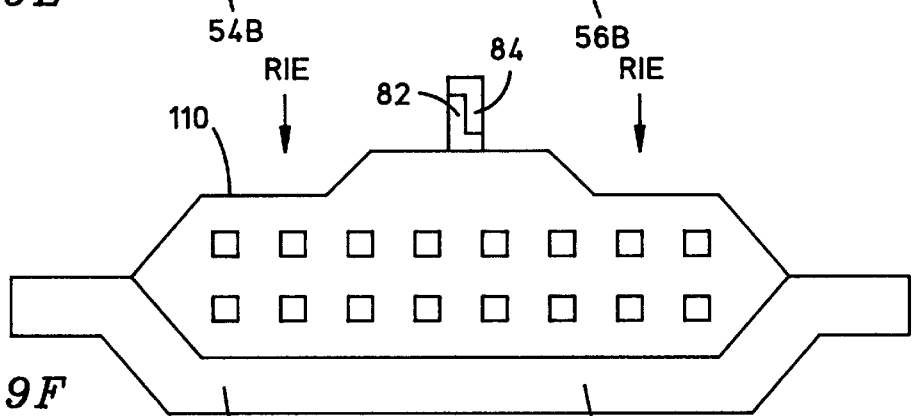
Figure 9G:
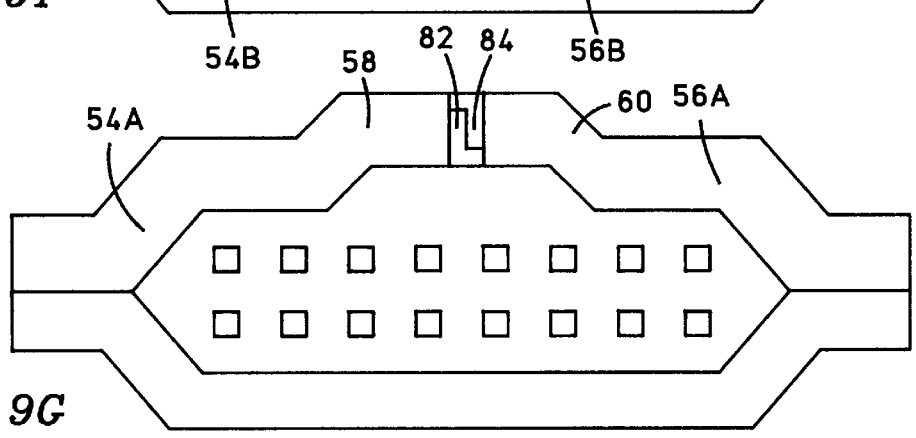
Figure 9H:
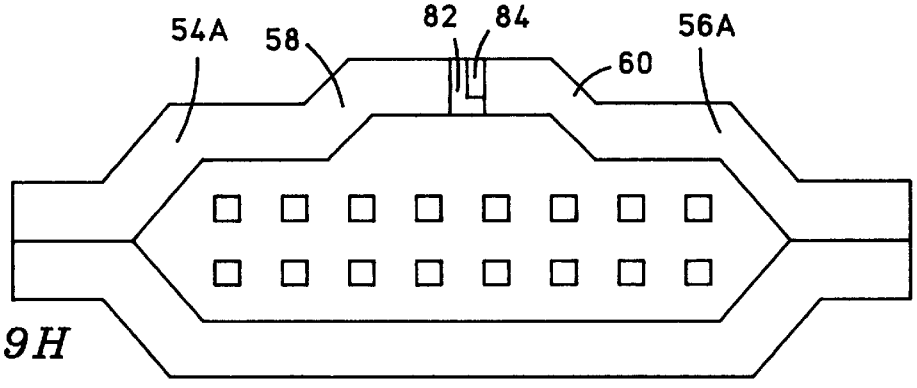

In FIG. 9F the low magnetic layer 130, the magnetic insulation layer 120 and the photoresist layer 114 are removed, except for the vertical components 82 and 84, by any suitable means such as reactive ion etching (RIE). As shown in FIG. 9G the components 54A and 56A of the first and second pole pieces are then formed with the vertical edges of the first and second pole tips 58 and 60 directly contacting the vertical components 82 and 84. At this point both of the vertical components 82 and 84 are L-shaped. Since the component 84 is a magnetic conductor the base of its L is shorting the first and second pole tips 58 and 60 in FIG. 9G and must be removed. As shown in FIG. 9H the base of the component 84 is removed by lapping so that there is no longer a short across the pole tips 58 and 60. This finishes the formation of the first and second gap layers 82 and 84.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A dual gap horizontal thin film inductive head comprising:
   first and second pole pieces, each pole piece formed from a material having a first magnetic moment;
   the pole pieces having first and second pole tips respectively;
   the first and second pole tips being separated by a gap;
   the gap comprising first and second gap layers, each of the first and second gap layers being sandwiched between the first and second pole tips;
   the first gap layer being made of a material which is a magnetic insulator;
   the second gap layer formed from a material having a second magnetic moment which is less than the first magnetic moment;
   an insulation stack located between the first and second pole pieces; and
   at least one coil embedded in the insulation stack for inducing a field in the first and second pole pieces which fringes across said gap.

2. An inductive head as claimed in claim 1 including:
   the pole piece material being NiFe and the material of the second gap layer being NiFeCr.

3. An inductive head as claimed in claim 2 including:
   the material of the first gap layer being tungsten.

4. An inductive head as claimed in claim 1 including:
   a portion of the first gap layer making direct contact with each of the first and second pole tips and the second gap layer making direct contact with the first gap layer and only one of the pole tips.

5. A dual gap horizontal thin film inductive head comprising:
   first and second pole pieces each pole piece formed from a material having a first magnetic moment;
   the pole pieces having first and second pole tips respectively;
   the first and second pole tips being separated by a gap;
   the gap comprising first and second gap layers;
   the first gap layer being made of a material which is a magnetic insulator;
   the second gap layer formed from a material having a second magnetic moment which is less than the first magnetic moment;
   a portion of the first Ran layer making direct contact with each of the first and second pole tips and the second gap layer making direct contact with the first gap layer and only one of the pole tips;
   the magnetic head having a head surface;
   the gap having a length which extends between the pole tips and parallel to the head surface;
   the first gap layer having an L shape in a plane perpendicular to the air bearing surface and along said length, the L shape having a base portion and an upright portion; and
   said base portion of the L shape of the first gap layer making said direct contact between the first and second pole tips and the upright portion of the L shape making direct contact with one of the pole tips and the second gap layer.

6. An inductive head as claimed in claim 5 including:
   an insulation stack between the pole pieces; and
   the base portion of the L shape of the first gap layer extending parallel to the air bearing surface and making direct contact with the insulation stack.

7. An inductive head as claimed in claim 6 including:
   the pole piece material being NiFe and the material of the second gap layer being NiFeCr.

8. An inductive head as claimed in claim 7 including:
   the material of the first gap layer being tungsten.

9. A horizontal inductive head comprising:
   first and second pole pieces, each pole piece being made of material which has a first magnetic moment;
   the pole pieces having first and second pole tips respectively;
   each pole tip having a vertical edge;
   the vertical edges of the first and second pole tips being separated by a gap;
   the gap comprising first and second vertically extending gap layers, each gap layer having oppositely facing first and second vertically extending surfaces;
   the first and second surfaces of the first gap layer making direct contact with the vertical edge of the first pole tip and the first surface of the second gap layer respectively and the second surface of the second gap layer making direct contact with the vertical edge of the second pole tip;
   the first gap layer being made of a material which is a magnetic insulator; the second gap layer being made of a material which has a second magnetic moment which is less than the first magnetic moment;
   an insulation stack located between the first and second pole pieces; and
   at least one coil embedded in the insulation stack for inducing a field in the first and second pole pieces which fringes across said gap.

10. A horizontal inductive head as claimed in claim 9 including:
    the first gap layer having a portion which makes direct contact with each vertical edge of the first and second pole tips.

11. A horizontal inductive head comprising:
    first and second pole pieces, each pole piece being made of material which has a first magnetic moment;
    the pole pieces having first and second pole tips respectively;
    each pole tip having a vertical edge; the vertical edges of the first and second pole tips being separated by a gap;
    the zap comprising first and second vertically extending gap layers each gap layer having oppositely facing first and second vertically extending surfaces;
    the first and second surfaces of the first gap layer making direct contact with the vertical edge of the first pole tip and the first surface of the second gap layer respectively and the second surface of the second gap layer making direct contact with the vertical edge of the second pole tip;
    the first gap layer being made of a material which is a magnetic insulator;
    the second gap layer being made of a material which has a second magnetic moment which is less than the first magnetic moment;
    the first gap layer having a portion which makes direct contact with each vertical edge of the first and second zap layers;

an insulation stack located between the first and second pole pieces;

at least one coil embedded in the insulation stack for inducing a field in the first and second pole pieces which fringes across said gap; and said portion of the first gap layer making direct contact with said insulation stack.

12. A horizontal inductive head as claimed in claim 11 including:

only one of the edges of the first and second pole tips making direct contact with the second gap layer.

13. A horizontal inductive head as claimed in claim 12 including:

the pole piece material being NiFe and the material of the second gap layer being NiFeCr.

14. A horizontal inductive head as claimed in claim 13 including:

the material of the first gap layer being tungsten.

15. A magnetic media drive comprising:

a housing;

a support mounted in the housing for supporting a dual gap horizontal thin film inductive read and write magnetic head;

medium moving means mounted in the housing for moving a magnetic medium past the head in a transducing relationship therewith;

positioning means connected to the support for moving the inductive head to multiple positions with respect to a moving magnetic medium so as to process signals with respect to multiple tracks on the magnetic medium;

control means connected to the inductive head, the magnetic medium moving means and the positioning means for controlling and processing signals with respect to the inductive head, for controlling movement of the magnetic medium and for controlling the position of the inductive head; and said dual gap horizontal thin film inductive read and write magnetic head including:

at least first and second pole piece layers and at least one gap layer;

the first and second pole piece layers being separated by only said at least one gap layer at a head surface and connected at a back gap that is recessed from the head surface;

a portion of at least one coil layer being located between the first and second pole piece layers for inducing write fields into the first and second pole piece layers and for receiving read fields from the first and second pole piece layers;

said at least one gap layer comprising first and second films;

the first film being a magnetic insulator;

each of the first and second pole piece layers having a respective magnetic moment;

the magnetic moment of the second film being less than the magnetic moment of each of the first and second pole piece layers;

an insulation stack located between the first and second pole pieces; and at least one coil embedded in the insulation stack for inducing a field in the first and second pole pieces which fringes across said gap.

16. A magnetic media drive as claimed in claim 15 including:

drive electronics connected to said at least one coil layer for inducing electrical signals into said at least one coil layer for causing said at least one coil layer to induce said write fields into the first and second pole piece layers and for receiving said read fields from said at least one coil layer.

17. A magnetic media drive as claimed in claim 16 including:

the pole piece layers being NiFe and the second film being NiFeCr.

18. A magnetic media drive as claimed in claim 17 including:

the first film being tungsten.

19. A magnetic media drive as claimed in claim 34 including:

a portion of the first film making direct contact with each of the first and second pole piece layers and the second film making direct contact with the first film and only one of the pole piece layers.

20. A dual gap horizontal thin film inductive read and write head apparatus comprising:

at least first and second pole piece layers and at least one gap layer;

the first and second pole piece layers being separated by only said at least one gap layer at a head surface and connected at a back gap that is recessed from the head surface;

a portion of at least one coil layer being located between the first and second pole piece layers for inducing write fields into the first and second pole piece layers and for receiving read fields from the first and second pole piece layers;

said at least one gap layer comprising first and second films;

the first film being a magnetic insulator;

each of the first and second pole piece layers having a respective magnetic moment; and the magnetic moment of the second film being less than the magnetic moment of each of the first and second pole piece layers.

21. A head apparatus as claimed in claim 20 including:

drive electronics connected to said at least one coil layer for inducing electrical signals into said at least one coil layer for causing said at least one coil layer to induce said write fields into the first and second pole piece layers and for receiving said read fields from said at least one coil layer.

22. A head apparatus as claimed in claim 20 including:

the pole piece layers being NiFe and the second film being NiFeCr.

23. A head apparatus as claimed in claim 22 including:

the first film being tungsten.

24. A dual gap horizontal thin film inductive read and write head apparatus comprising:

at least first and second pole piece layers and at least one gap layer;

the first and second pole piece layers being separated by only said at least one gap layer at a head surface and connected at a back gap that recessed from the head surface;

a portion of at least one coil layer being located between the first and second pole piece layers for inducing write fields into the first and second pole piece layers and for receiving read fields from the first and second pole piece layers;

said at least one gap layer comprising first and second film the first film being a magnetic insulator;

each of the first and second pole piece layers having a respective magnetic moment the magnetic moment of the second film being less than the magnetic moment of each of the first and second pole piece layers; and a portion of the first film making direct contract with each of the first and second pole piece layers and the second film making direct contact with the first film and only one of the pole piece layers.

25. A magnetic media drive comprising:

a housing;

a support mounted in the housing for supporting a dual gap horizontal thin film inductive read and write magnetic head;

medium moving means mounted in the housing for moving a magnetic medium past the magnetic head in a transducing relationship therewith;

positioning means connected to the support for moving the magnetic head to multiple positions with respect to a moving magnetic medium so as to process signals with respect to multiple tracks on the magnetic medium;

control means connected to the magnetic head, the magnetic medium moving means and the positioning means for controlling and processing signals with respect to the magnetic head, for controlling movement of the magnetic medium and for controlling the position of the magnetic head; and said dual gap horizontal thin film inductive read and write magnetic head including:

at least first and second pole piece layers and at least one gap layer;

the first and second pole piece layers being separated by only said at least one gap layer at a head surface and connected at a back gap that is recessed from the head surface;

a portion of at least one coil layer being located between the first and second pole piece layers for inducing write fields into the first and second pole piece layers and for receiving read fields from the first and second pole piece layers;

said at least one gap layer comprising first and second films;

the first film being a magnetic insulator;

each of the first and second pole piece layers having a respective magnetic moment;

the magnetic moment of the second film being less than the magnetic moment of each of the first and second pole piece layers;

a portion of the first film making direct contact with each of the first and second pole piece layers and the second film making direct contact with the first film and only one of the pole piece layers;

the gap having a length which extends between the pole piece layers at the head surface and parallel to the head surface;

the first film layer having an L shape in a plane perpendicular to the head surface and along said length, the L shape having a base portion and an upright portion; and said base portion of the L shape of the first film making said direct contact between the first and second pole piece layers and the upright portion of the L shape making direct contact with one of the pole piece layers and the second film; and drive electronics connected to said at least one coil layer for inducing electrical signals into said at least one coil layer for causing said at least one coil layer to induce said write fields into the first and second pole piece layers and for receiving said read fields from said at least one coil layer.

26. A magnetic media drive as claimed in claim 25 including:

an insulation stack between the pole piece layers; and the base portion of the L shape of the first film extending parallel to the head surface and making direct contact wit the insulation stack.

27. A magnetic media drive as claimed in claim 26 including:

the pole piece layers being NiFe and the second film being NiFeCr.

28. A magnetic media drive as claimed in claim 27 including:

the first film being tungsten.

29. A dual gap horizontal thin film inductive read and write head apparatus comprising:

at least first and second pole piece layers and at least one gap layer;

the first and second pole piece layers being separated by only said at least one gap layer at a head surface and connected at a back gap that is recessed from the head surface;

a portion of at least one coil layer being located between the first and second pole piece layers for inducing write fields into the first and second pole piece layers and for receiving read fields from the first and second pole piece layers;

said at least one gap layer comprising first and second films;

the first film being a magnetic insulator;

each of the first and second pole piece layers having a respective magnetic moment;

the magnetic moment of the second film being less than the magnetic moment of each of the first and second pole piece layers;

a portion of the first film making direct contact with each of the first and second pole piece layers and the second film making direct contact with the first film and only one of the pole piece layers;

the gap layer having a length which extends between the pole piece layers at the head surface and parallel to the head surface;

the first film having an L shape in a plane perpendicular to the head surface and along said length, the L shape having a base portion and an upright portion; and said base portion of the L shape of the first film making said direct contact between the first and second pole piece layers and the upright portion of the L shape making direct contact with one of the pole piece layers and the second film.

30. A head apparatus as claimed in claim 29 including:

an insulation stack between the pole piece layers; and the base portion of the L shape of the first film extending parallel to the head surface and making direct contact with the insulation stack.

31. A head apparatus as claimed in claim 30 including:

the pole piece layers being NiFe and the second film being NiFeCr.

32. A head apparatus as claimed in claim 31 including:

the first film being tungsten.

* * * * *